(12) United States Patent
Satake

(10) Patent No.: US 8,654,500 B2
(45) Date of Patent: Feb. 18, 2014

(54) LIGHTNING-RESISTANT FASTENER

(75) Inventor: Koji Satake, Tokyo (JP)

(73) Assignee: Mitsubishi Aircraft Corporation, Aichi (JP)

( * ) Notice: Subject to any disclaimer, the term of this patent is extended or adjusted under 35 U.S.C. 154(b) by 0 days.

(21) Appl. No.: 13/326,957

(22) Filed: Dec. 15, 2011

(65) Prior Publication Data

US 2012/0160960 A1    Jun. 28, 2012

(30) Foreign Application Priority Data

Dec. 28, 2010  (JP) ................................. 2010-293167

(51) Int. Cl.
    *H05F 3/00*    (2006.01)
(52) U.S. Cl.
    USPC .......................................................... 361/218
(58) Field of Classification Search
    USPC .......................................................... 361/218
    See application file for complete search history.

(56) References Cited

U.S. PATENT DOCUMENTS

| 4,289,061 | A |   | 9/1981  | Emmett |   |
|---|---|---|---|---|---|
| 4,502,092 | A | * | 2/1985  | Bannink et al. | 361/218 |
| 4,630,168 | A | * | 12/1986 | Hunt | 361/218 |
| 5,461,534 | A | * | 10/1995 | Gondot et al. | 361/218 |
| 7,307,825 | B2 | * | 12/2007 | De La Fuente De Ana et al. | 361/212 |
| 7,755,876 | B2 | * | 7/2010  | Morrill et al. | 361/218 |
| 2002/0172576 | A1 | * | 11/2002 | Keener | 411/504 |
| 2003/0044256 | A1 | * | 3/2003  | Nickerson et al. | 411/338 |
| 2009/0284427 | A1 | * | 11/2009 | Ceccom et al. | 343/705 |
| 2010/0224724 | A1 | * | 9/2010  | Kamino et al. | 244/1 A |
| 2010/0277849 | A1 |   | 11/2010 | Morrill et al. |   |
| 2010/0320315 | A1 | * | 12/2010 | Kashiwagi et al. | 244/1 A |
| 2011/0088473 | A1 | * | 4/2011  | Nelson et al. | 73/602 |
| 2011/0174536 | A1 | * | 7/2011  | Wilson et al. | 174/84 S |
| 2012/0160960 | A1 | * | 6/2012  | Satake | 244/1 A |

FOREIGN PATENT DOCUMENTS

| JP | 51-85070 A | 7/1976 |
|---|---|---|
| JP | 02-007398 A | 1/1990 |
| JP | 2001-263314 A | 9/2001 |
| JP | 2010-516538 A | 5/2010 |
| JP | 2010-254287 A | 11/2010 |
| JP | 2012-522683 A | 9/2012 |
| WO | 20121027763 A1 | 3/2012 |

OTHER PUBLICATIONS

Japanese Office Action for Patent Application No. 2010-293167 dated Sep. 18, 2013.

* cited by examiner

*Primary Examiner* — Ronald W Leja
(74) *Attorney, Agent, or Firm* — Pearne & Gordon LLP

(57) ABSTRACT

There is provided a lightning-resistant fastener that can secure sufficient lightning-resistance performance at low cost and realize efficiency of field work and improvement of reliability. An insulating coat film 40 is formed in a region opposed to a structural member 22 in a shaft section 25c of a fastener main body 25 and an insulating layer is interposed between the structural member 22 and the shaft section 25c of the fastener main body 25, whereby an electric current is fed along a head section 25b side of the fastener main body 25 and a wing panel 21 when lightning occurs. This suppresses the electric current from flowing to the front end portion side of the fastener main body 25, i.e., the interior side of a wing 20 and prevents arc discharge from occurring inside the wing 20.

13 Claims, 6 Drawing Sheets

LIGHTNING-RESISTANT FASTENER

TECHNICAL FIELD

The present invention relates to a lightning-resistant fastener, which is used for an airframe of an aircraft, especially for a wing thereof.

BACKGROUND ART

A wing constituting an airframe of an aircraft is of a hollow construction, and a wing surface panel forming a wing surface is fixed to a structural member existing in the wing by a fastener member (fastener).

The fastener member fastens the wing to the structural member by inserting a pin-shaped fastener main body into through holes, which have been formed in both the wing and the member attached to the wing, from the outside of wing, and by fixing the front end portion of the fastener main body by using a fixture from the interior side of the wing.

The aircraft must make thoroughgoing provisions against lightning strikes. On a discontinuous surface between the wing surface panel and the fastener member or the like, dielectric breakdown tends to be caused by electric field concentration due to the presence of a structure end (an edge effect). When a leader that develops starting from a place of the dielectric breakdown and a leader that develops from a thundercloud combine, a lightning current of several hundred kiloamperes flows to the airframe.

Since a fuel tank is housed in the internal space of the wing, it is necessary to reliably suppress the production of arc discharge due to an electric current that flows into the tank via a fastener at the time of lightning strikes.

To meet such necessity, a structure has conventionally been proposed in which, as shown in FIG. 6, on the inside of a wing 1, a cap 6 is installed in a state of being separate from a fastener main body 4a of a fastener member 4, which penetrates a first member 2 corresponding to the wing surface panel and a second member 3 installed within the wing, and a fixture 4b, and an air-gap 7 filled with air is formed between the cap 6 and the fastener main body 4a, the fixture 4b (for example, refer to Patent Document 1).

However, the technique descried in Patent Document 1 does not provide a structure in which the cap 6 can be positioned with respect to the fastener member 4, and the installation position of the cap 6 depends on the worker. Therefore, the center of the cap 6 and the center of the fastener member 4 may be greatly misaligned. If, in the air-gap 7, a place where a gap between the fastener member 4 and the cap 6 is narrow is produced, the function (insulation properties) of the cap 6 decreases. In the worst case, if the cap 6 is installed in a state of being in contact with the fastener member 4, the function itself of the cap 6 may be impaired greatly. Therefore, it is necessary to perform management to prevent such impairment from occurring through the greatest care and guarantee of quality.

The cap 6 is installed on the second member 3 with an adhesive 9 as shown in FIG. 6A, or is outer-peripherally covered with a rubber (insulating material) 10 as shown in FIG. 6B. Therefore, in the installation site, the bonding work or the coating work of the rubber 10 is required, so that the work takes much time and labor. Needless to say, the interior of the wing 1 of the aircraft has a narrow space, and the above-described work performed at a secluded position provides very poor workability. Moreover, since the fastener members 4 are provided at several thousands to several tens of thousands of places throughout the wing 1, the deterioration in workability leads directly to the rise in cost.

Furthermore, the above-described work is what is called manual work, so that the work quality is easily varied depending on the worker, which also exerts an influence on the reliability. Therefore, management such as accrediting for these kinds of work (confirming through a practical test or the like that the worker has a specific technical level and giving authorization to the worker) is necessary.

Therefore, the inventors have already proposed the technique for the configuration in which an engaging section is formed in a portion of a fastener member projecting to the interior side of an airframe, an engaged section engaging with the engaging section of the fastener member is formed in the center of the inner circumferential surface of a cap, and the engaging section of the fastener member is engaged with the engaged section (see Patent Document 2).

CITATION LIST

Patent Document
 Patent Document 1: Japanese Patent Laid-Open No. 2-7398
 Patent Document 2: Japanese Patent Laid-Open No. 2010-254287

SUMMARY OF THE INVENTION

Technical Problems to be Solved by the Invention

However, even when the cap described above is used, it is necessary to mount the cap and fill a sealant in the cap. From the viewpoint of efficiency of work in the site and a reduction in cost, there is still room of improvement.

If it is taken into account that the cap drops by any chance, it can be said that there is also room of improvement in terms of reliability. Therefore, it is necessary to perform management to prevent such impairment from occurring through the greatest care, the guarantee of quality, and the accrediting as described above.

The present invention has been accomplished to solve the above-described technical problems, and accordingly an object thereof is to provide a lightning-resistant fastener that can secure sufficient lightning-resistance performance at lower cost and realize efficiency of field work and improvement of reliability.

Solution to the Problems

To achieve the above object, the present invention provides a lightning-resistant fastener comprising: a fastener main body for fastening a second member to a first member, which constitutes an airframe of an aircraft, on the interior side of the airframe, in which the fastener main body penetrates through a first hole formed in the first member and a second hole formed in the second member from the first member side; a fastening member mounted on the fastener main body projecting to the second member side; and an insulating section made of an insulative material and formed between a portion opposed to the second hole in the fastener main body and the second hole to be continuous in the entire circumferential direction.

When the insulating section is provided between the portion opposed to the second hole in the fastener main body and the second hole, electric resistance between the fastener main body and the second member is larger than electric resistance between the fastener main body and the first member.

Thereby, when the first member is struck by lightning, most of an electric current generated by the lightning flows along the first member.

The insulating section can be an insulating coat film made of an insulating material formed in the portion opposed to the second hole in the fastener main body.

The insulating section can also be a cylindrical insulating collar member made of an insulating material provided in the portion opposed to the second hole in the fastener main body.

Further, a gap is formed between the portion opposed to the second hole in the fastener main body and the second hole and the gap can be the insulating section. The diameter of the portion opposed to the second hole in the fastener main body is formed smaller than the diameter of a portion opposed to the first hole in the fastener main body. Therefore, the gap can be formed between the portion opposed to the second hole in the fastener main body and the second hole.

Advantageous Effects of Invention

According to the present invention, when the insulating section is provided between the portion opposed to the second hole in the fastener main body and the second hole, the electric resistance between the fastener main body and the second member is larger than the electric resistance between the fastener main body and the first member. Thereby, when lightning occurs, most of an electric current generated by the lightning flows along the first member. As a result, it is possible to reduce an electric current flowing to the second member side and prevent arc discharge from easily occurring in the fastener main body and on the second member side.

Such an insulating section can be formed in the fastener main body, the first member, the second member, or the like. It is unnecessary to particularly perform work in a site where the fastener member is mounted. Therefore, it is possible to secure sufficient lightning-resistant performance at lower cost and realize efficiency of field work and improvement of reliability.

DESCRIPTION OF EMBODIMENTS

The present invention will now be described in detail based on an embodiment shown in the accompanying drawings.

Figure 1:
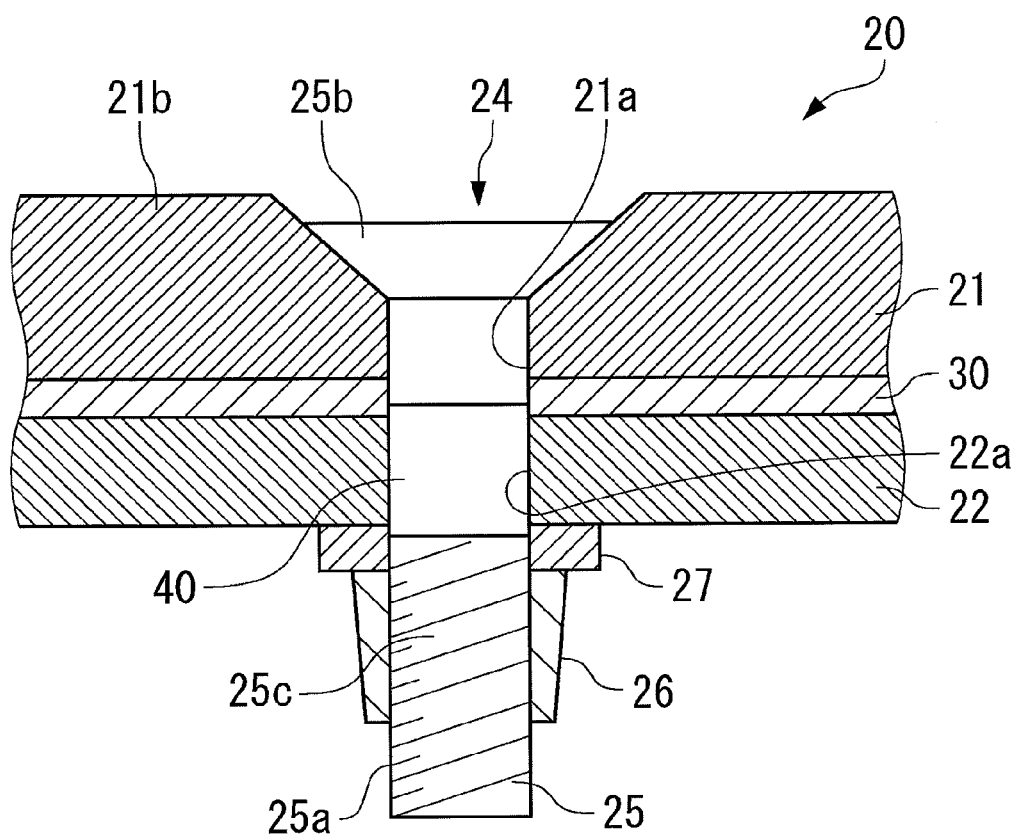
FIG. 1 is a sectional view of a lightning-resistant fastener in accordance with an embodiment of the present invention.

FIG. 1 is a sectional view of a part of a wing constituting an airframe of an aircraft, to which a lightning-resistant fastener in accordance with this embodiment is applied.

As shown in FIG. 1, a wing 20 comprises a wing panel (first member) 21 as the outer shell thereof. The wing panel 21 is made of a metallic material such as an aluminum alloy. A structural member for reinforcement, a fuel tank, and various types of equipment, which are provided within the wing 20, are fixed to the wing panel 21 via a structural member (second member) 22 such as a stay. The stay is made of a metallic material such as an aluminum alloy. The structural member 22 such as the stay is installed on the wing panel 21 by using a fastener member 24.

The fastener member 24 comprises a pin-shaped fastener main body 25, a collar (fastening member) 26 mounted on the fastener main body 25 on the interior side of the wing 20, and a washer 27 made of an insulating material.

The fastener main body 25 and the collar 26 are generally made of a metallic material such as a titanium alloy from the viewpoint of strength.

The washer 27 is preferably made of resin having insulating properties such as PPS (polyphenylene sulfide resin), polyimide, PEEK (polyether ether ketone resin), or nylon resin.

The pin-shaped fastener main body 25 comprises a screw groove 25a on the front end portion thereof. The rear end portion of the pin-shaped fastener main body 25 is formed into a head section 25b having a larger diameter than the front end portion side. This fastener main body 25 is inserted into a hole (first hole) 21a and a hole (second hole) 22a, which are formed penetratingly in the wing panel 21 and the structural member 22, from the outside of the wing 20. The front end portion of the pin-shaped fastener main body 25 is projected to the inside of the wing 20 in a state in which the head section 25b in the rear end portion is abutted against the circumferential surface of the hole 21a.

The collar 26 has a tubular shape, and the inner peripheral surface thereof comprises a screw groove engaging with the screw groove 25a of the fastener main body 25. This collar 26 is screwed onto the screw groove 25a of the fastener main body 25 projecting to the inside of the wing 20. Thereby, the wing panel 21 and the structural member 22 are held between the head section 25b of the fastener main body 25, the collar 26, and the washer 27 and thereby the structural member 22 is fixed to the wing panel 21. The collar 26 is preferably a self-lock type that can prevent slack after the collar 26 is screwed into the fastener main body 25.

An insulative primer layer 30 applied to at least one of the wing panel 21 and the structural member 22 is interposed between the wing panel 21 and the structural member 22.

In this embodiment, the outer circumferential surface of a shaft section 25c of the fastener main body 25 comprises an insulating coat film (insulating section) 40 made of an insulative material in a region opposed to the inner circumferential surface of the hole 22a, which is formed in the structural member 22.

Such an insulating coat film 40 can be formed by, for example, forming a film of alumina on the surface of the shaft section 25c of the fastener main body 25 by a method such as baking, spray coating, or sputtering.

The insulating coat film 40 is formed, whereby an insulating layer is interposed between the structural member 22 and the shaft section 25c of the fastener main body 25.

Then, compared with electric resistance R1 between the wing panel 21 and the fastener main body 25 between which an insulating layer is not interposed, electric resistance R2 between the structural member 22 and the fastener main body 25 is extremely large.

For example, when the head section 25b of the fastener main body 25 is struck by lightning, it is known that most of an electric current generated by the lightning basically flows along a surface layer section 21b of the wing panel 21. At this point, if the electric resistance R1 between the wing panel 21 and the fastener main body 25 is set considerably smaller than the electric resistance R2 between the structural member 22 and the fastener main body 25, the electric current more surely flows along the in-plane direction of the wing panel 21.

As described above, the insulating coat film 40 is formed in the region opposed to the structural member 22 in the shaft section 25*c* of the fastener main body 25 and the insulating layer is interposed between the structural member 22 and the shaft section 25*c* of the fastener main body 25. This makes it possible to feed most of an electric current along the wing panel 21 on the head section 25*b* side of the fastener main body 25 when lightning occurs. Thereby, it is possible to suppress the electric current from flowing to the front end portion side of the fastener main body 25, i.e., the interior side of the wing 20, prevent arc discharge from occurring inside the wing 20, and improve lightning-resistance performance.

At this point, since the insulating coat film 40 is only formed on the surface of the shaft section 25*c* of the fastener main body 25, it is possible to obtain the effect at low cost. Since the insulating coat film 40 is formed in a manufacturing process of the fastener main body 25, it is unnecessary to perform particular work in an assembly site of the wing 20. Compared with mounting of a cap or filling and application of a sealant, it is possible to realize efficiency of field work. Further, after attachment, since the insulating coat film 40 does not drop, it is possible to obtain high reliability.

EXAMPLE

An analytical calculation performed for verifying the effect obtained by forming the insulating coat film 40 is described below.

In the configuration shown in FIG. 1, the wing panel 21 made of an aluminum alloy having thickness of 4 mm and the structural member 22 made of the aluminum alloy having thickness of 4 mm were fastened by the fastener main body 25 made of a titanium alloy having shaft diameter of 6 mm and the collar 26.

At this time, simulating a case in which an insulating coat of alumina or the like was applied to a portion of the fastener main body 25 opposed to the structural member 22, electric resistance between the fastener main body 25 and the structural member 22 was set to 1.0 MΩ (Case 1). Simulating a case in which the insulating coat is not formed, electric resistance between the fastener main body 25 and the structural member 22 was set to zero (electric resistance between the fastener main body 25 and the structural member 21 and electric resistance between the fastener main body 25 and the structural member 22 were equal, Case 2). As an intermediate case between the case in which the insulating coat is formed and the case in which the insulating coat is not formed, for comparison, electric resistance between the fastener main body 25 and the structural member 22 was set to 1 mΩ (Case 3). The analytical calculation was carried out concerning these cases and effectiveness was verified.

In each of the Cases 1, 2, and 3, simulating an electric current during lightning, an electric current of 200 kA (Lightning current waveform is Component A presented by SAE ARP5412A) was given to the head section 25*b* of the fastener main body 25. A current change at that time was measured in a portion of the fastener main body 25.

Figure 2:
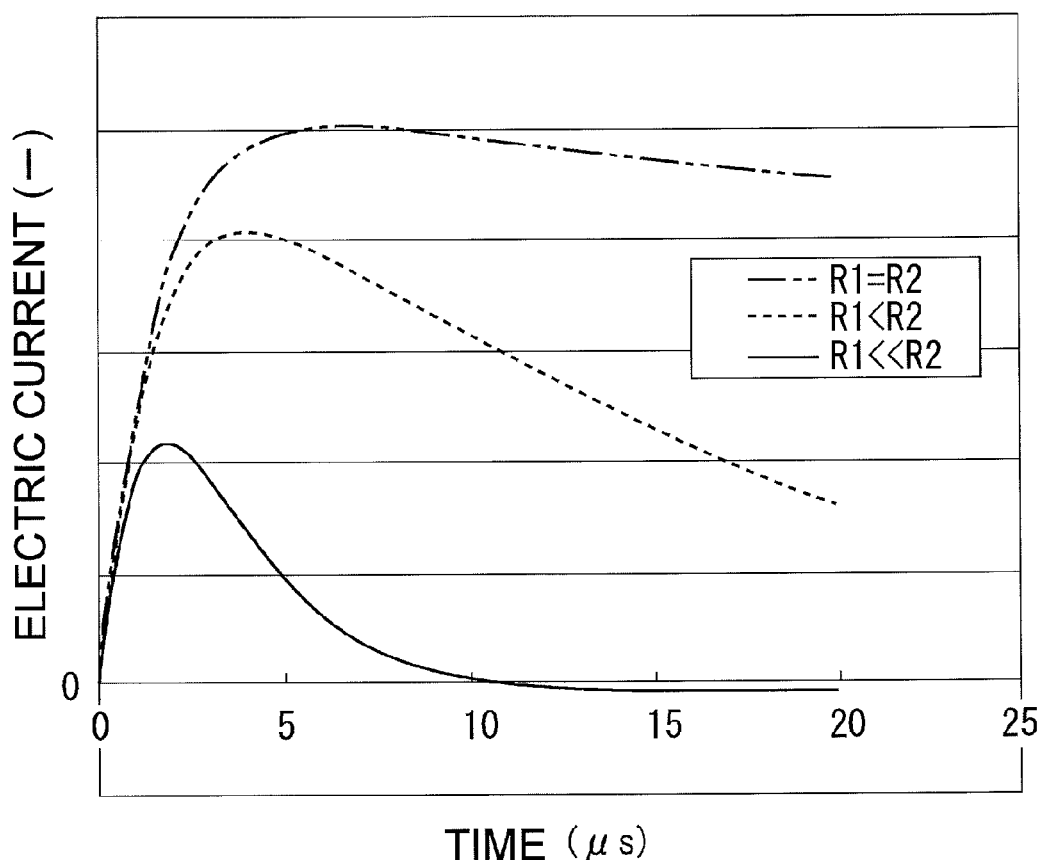
FIG. 2 is a diagram showing an evaluation result of lightning-resistant performance in the lightning-resistant fastener shown in FIG. 1.

The result of the measurement is shown in FIG. 2.

As shown in FIG. 2, the Case 1 (R1<<R2) in which the insulating coat film 40 was formed in the portion of the fastener main body 25 opposed to the structural member 22 and the electric resistance R1 between the wing panel 21 and the fastener main body 25 was set smaller than the electric resistance R2 between the structural member 22 and the fastener main body 25, and the Case 3 (R1<R2) were compared with the Case 2 (R1=R2) in which the electric resistance R1 and the electric resistance R2 were equal, it was confirmed that a flowing current amount was considerably small. In particular, in the Case 1 in which the electric resistance between the fastener main body 25 and the structural member 22 was set to 1.0 MΩ simulating the case in which the insulating coat of alumina or the like was applied, a current amount was particularly small.

(Application Example)

An application example of the lightning-resistant fastener according to the present invention is described below.

Figure 3:
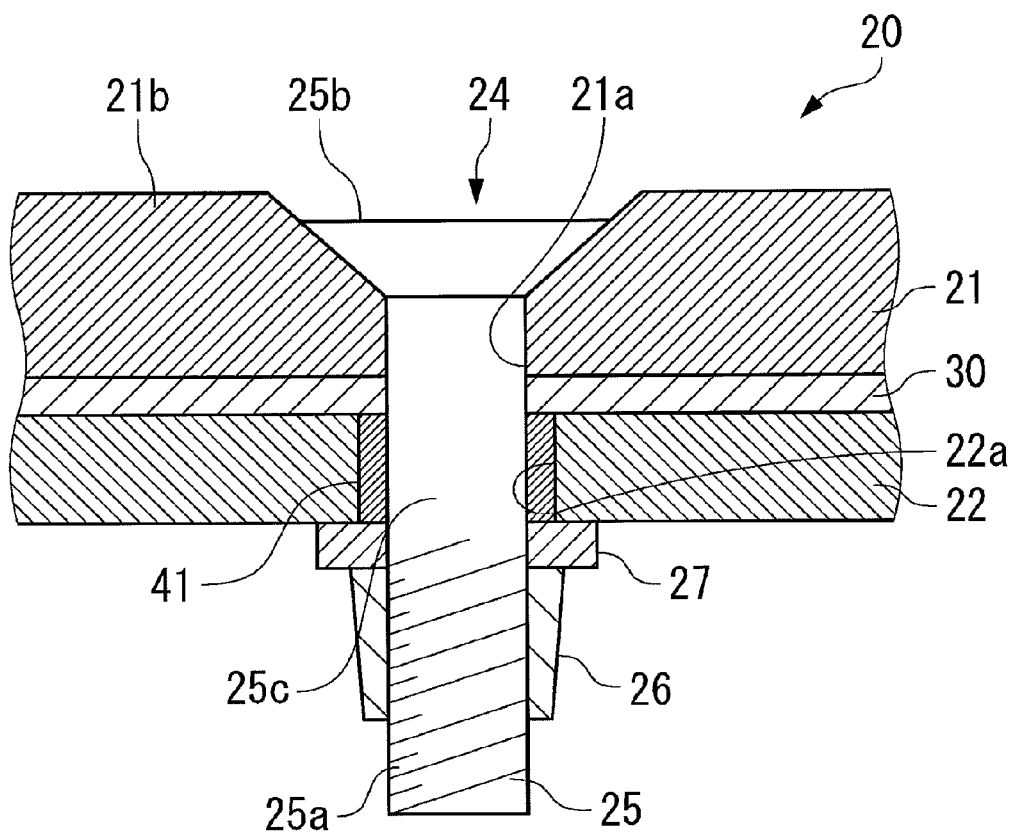
FIG. 3 is a sectional view showing an application example of the lightning-resistant fastener.

First, as shown in FIG. 3, instead of the insulating coat film 40, the shaft section 25*c* of the fastener main body 25 may be provided with an insulating collar member (insulating section) 41 made of an insulating material in the region opposed to the inner circumferential surface of the hole 22*a* of the structural member 22.

Such an insulating collar member 41 can be made of, for example, phenolic resin. The insulating collar member 41 having a cylindrical shape is interposed between the shaft section 25*c* of the fastener main body 25 and the inner circumferential surface of the hole 22*a* of the structural member 22.

Figure 4:
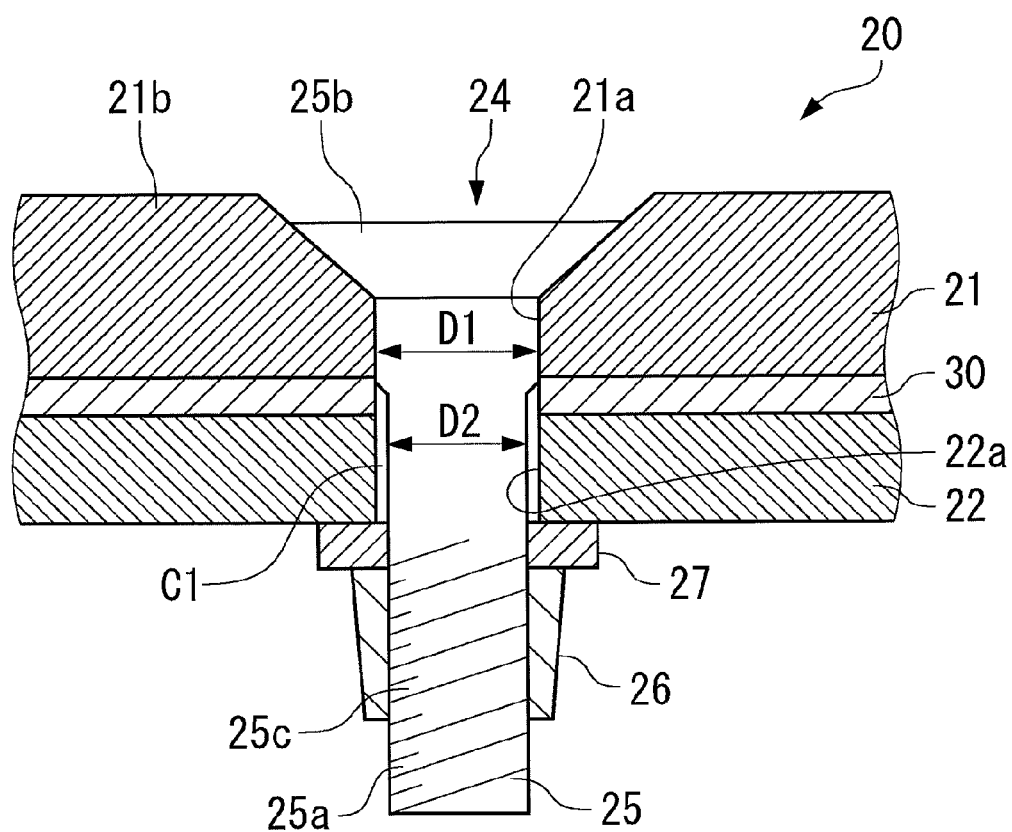
FIG. 4 is a sectional view showing another application example of the lightening-resistant fastener.

As shown in FIG. 4, the shaft section 25*c* of the fastener main body 25 may be configured such that an outer diameter D2 of the region opposed to the inner circumferential surface of the hole 22*a* of the structural member 22 is smaller than an outer diameter D1 of a region opposed to the inner circumferential surface of the hole 21*a* of the wing panel 21.

Thereby, a gap (insulating section) C1 between the inner circumferential surface of the hole 22*a* of the structural member 22 and the shaft section 25*c* of the fastener main body 25 is larger than a gap between the region opposed to the inner circumferential surface of the hole 21*a* of the wing panel 21 and the shaft section 25*c* of the fastener main body 25. Thereby, the electric resistance R2 between the structural member 22 and the fastener main body 25 can be set larger than the electric resistance R1 between the wing panel 21 and the fastener main body 25 through the air present in the gap C1. An effect same as that described above is obtained.

Figure 5:
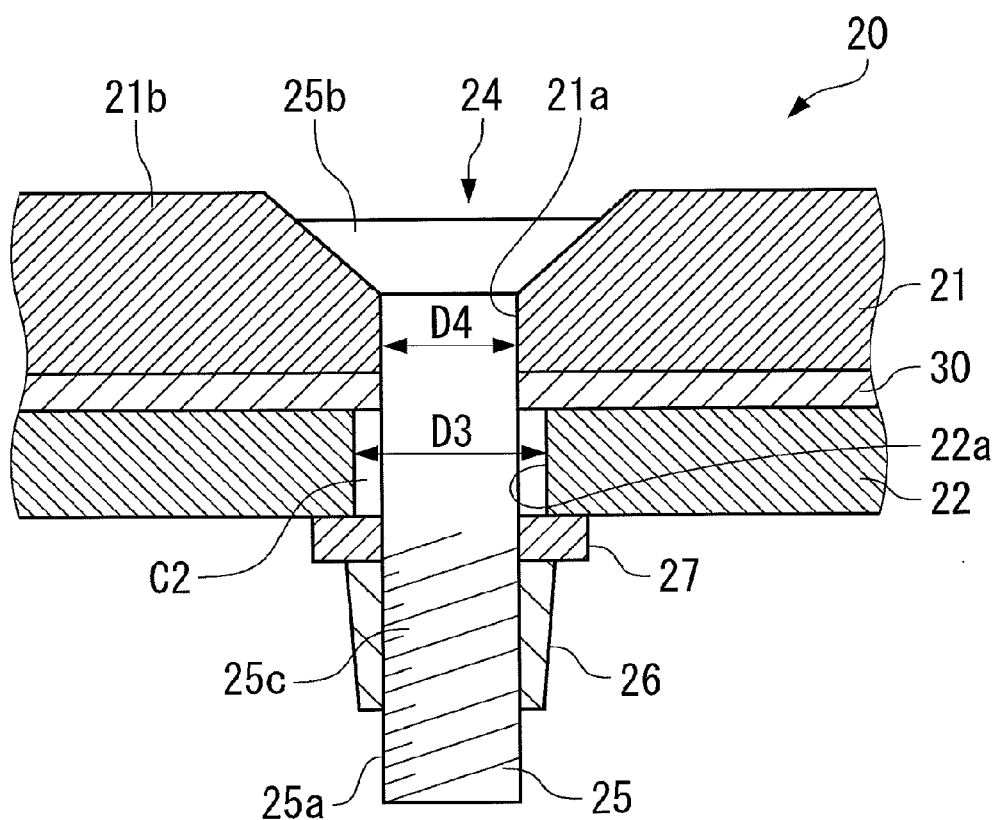
FIG. 5 is a sectional view showing still another application example of the lightning-resistant fastener.
Figure 6A:
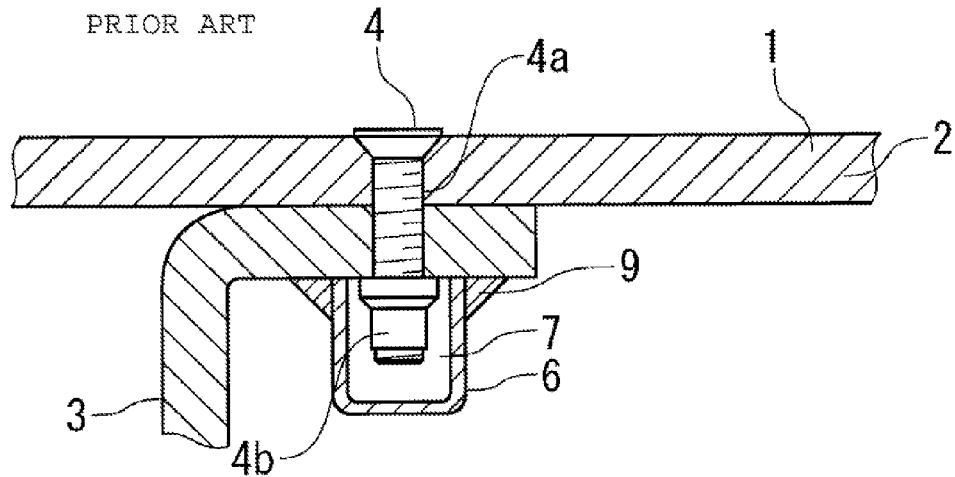
FIG. 6A is a sectional view showing a prior art lightning-resistant fastener.
Figure 6B:
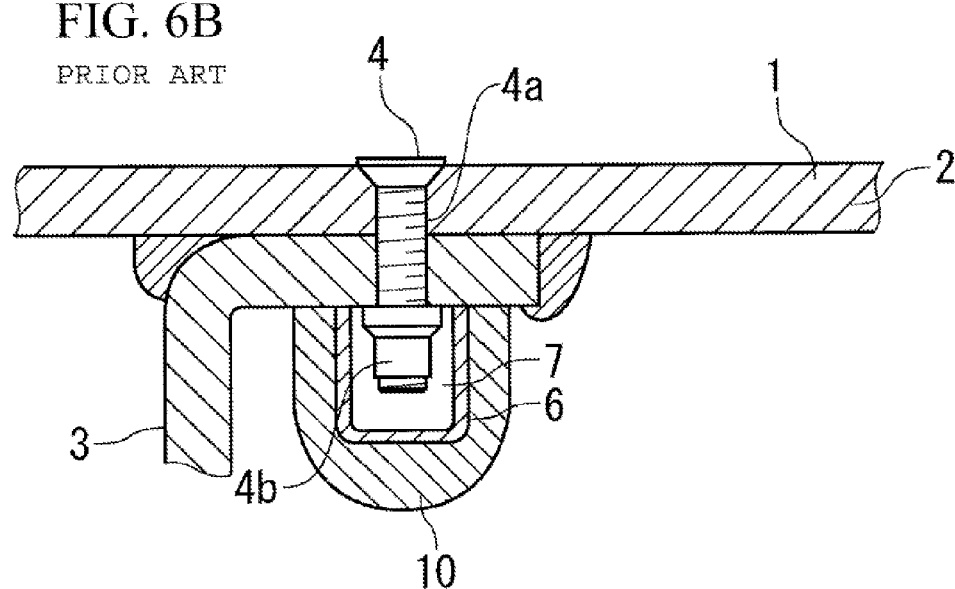
FIG. 6B is a sectional view showing another prior art lightning-resistant fastener.

Further, as shown in FIG. 5, an inner diameter D3 of the hole 22*a* of the structural member 22 may be formed larger than an inner diameter D4 of the hole 21*a* of the wing panel 21.

Thereby, a gap (insulating section) C2 between the inner circumferential surface of the hole 22*a* of the structural member 22 and the shaft section 25*c* of the fastener main body 25 is larger than a gap between the region opposed to the inner circumferential surface of the hole 21*a* of the wing panel 21 and the shaft section 25*c* of the fastener main body 25. Thereby, the electric resistance R2 between the structural member 22 and the fastener main body 25 can be set larger than the electric resistance R1 between the wing panel 21 and the fastener main body 25 through the air present in the gap C2. An effect same as that described above is obtained.

In the embodiment, the configurations are described concerning the wing panel 21, the structural member 22, the fastener main body 25, and the collar 26. However, the shapes and the materials thereof can be changed as appropriate. The present invention can be applied not only to the wing 20 but also as the fastener member 24 used in other portions.

Besides, the configurations described in the above embodiment can be selected, can be combined, or can be changed as appropriate to other configurations without departing from the gist of the present invention.

The invention claimed is:

1. A lightning-resistant fastener comprising:
a fastener main body for fastening a second member to a first member on an interior side of an aircraft, the first member constituting a wing of the aircraft and the second member being a structural member, wherein the fastener main body penetrates through a first hole formed in the first member and a second hole formed in the second member from the first member side;
an insulative primer layer interposed between the first member and the second member;
a fastening member mounted on the fastener main body projecting to the second member side; and
an insulating section made of an insulative material and formed between the second hole and a portion of the fastener main body opposed to the second hole to be continuous in an entire circumferential direction, the insulating section not being formed between the first hole and a portion of the fastener main body that is opposed to the first hole.

2. The lightning-resistant fastener according to claim 1, wherein the insulating section is an insulating coat film made of an insulating material formed in the portion of the fastener main body that is opposed to the second hole.

3. The lightning-resistant fastener according to claim 1, wherein the insulating section is a cylindrical insulating collar member made of an insulating material provided in the portion of the fastener main body that is opposed to the second hole.

4. The lightning-resistant fastener according to claim 1, wherein a gap is formed between the second hole and the portion of the fastener main body opposed to the second hole, and the gap is the insulating section.

5. The lightning-resistant fastener according to claim 4, wherein a diameter of the portion of the fastener main body that is opposed to the second hole is formed smaller than a diameter of the portion of the fastener main body that is opposed to the first hole, and, therefore, the gap is formed between the second hole and the portion of the fastener main body that is opposed to the second hole.

6. The lightning-resistant fastener according to claim 1, wherein the first member (21) is conductive.

7. The lightning-resistant fastener according to claim 1, wherein the first member (21) is made of a metallic material.

8. The lightning-resistant fastener according to claim 1, wherein the first member (21) is made of an aluminum alloy.

9. The lightning-resistant fastener according to claim 1, wherein the second member (22) is conductive.

10. The lightning-resistant fastener according to claim 1, wherein the second member (22) is made of a metallic material.

11. The lightning-resistant fastener according to claim 1, wherein the second member (22) is made of an aluminum alloy.

12. The lightning-resistant fastener according to claim 1, wherein the first member (21) and the second member (22) are conductive.

13. The lightning-resistant fastener according to claim 1, wherein the first member (21) and the second member (22) are made of a metallic material.

* * * * *